United States Patent
Manotas, Jr.

(10) Patent No.: US 9,043,048 B2
(45) Date of Patent: May 26, 2015

(54) RF BIOMETRIC IGNITION CONTROL SYSTEM

(75) Inventor: Jesus Manotas, Jr., Peachtree City, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 543 days.

(21) Appl. No.: 13/272,644

(22) Filed: Oct. 13, 2011

(65) Prior Publication Data

US 2013/0096733 A1    Apr. 18, 2013

(51) Int. Cl.
*B60R 25/25* (2013.01)
*F02N 11/08* (2006.01)
*G06K 9/00* (2006.01)

(52) U.S. Cl.
CPC ............ *B60R 25/25* (2013.01); *F02N 11/0807* (2013.01); *G06K 9/00255* (2013.01); *G06K 9/00838* (2013.01)

(58) Field of Classification Search
CPC ...... B60R 25/045; B60R 25/04; B60R 25/25; B60R 25/252; F02N 11/0807; G06K 9/00255; G06K 9/00838
USPC ........................................ 701/2; 180/283, 287
See application file for complete search history.

(56) References Cited

U.S. PATENT DOCUMENTS

| | | | |
|---|---|---|---|
| 5,867,802 A | 2/1999 | Borza | |
| 6,100,811 A * | 8/2000 | Hsu et al. | 340/5.83 |
| 6,924,729 B1 * | 8/2005 | Aschauer et al. | 340/5.53 |
| 2002/0059523 A1 | 5/2002 | Bacchiaz et al. | |
| 2004/0232229 A1 | 11/2004 | Gotfried et al. | |
| 2004/0252013 A1 * | 12/2004 | Fuks et al. | 340/5.52 |
| 2005/0237150 A1 * | 10/2005 | Sun et al. | 340/5.52 |
| 2011/0035120 A1 | 2/2011 | Taylor et al. | |

FOREIGN PATENT DOCUMENTS

EP    1031479 A2 *  8/2000  ............. B60R 25/04

OTHER PUBLICATIONS

PCT International Search Report mailed Jan. 4, 2013 for PCT/US2012/59694; Int'l Filing Date of Oct. 11, 2012.
PCT International Written Opinion mailed Jan. 4, 2013 for PCT/US2012/59694; Int'l Filing Date of Oct. 11, 2012.

* cited by examiner

*Primary Examiner* — John Q Nguyen
*Assistant Examiner* — Nadeem Odeh
(74) *Attorney, Agent, or Firm* — Laurence S. Roach, Esq.

(57) ABSTRACT

An electronic ignition control system includes a keyfob having a biometric sensor that senses an identifying biological characteristic of the user. The keyfob also has a transmitter that transmits an air-borne signal dependent upon the identifying biological characteristic. A vehicle includes a motor and an ignition that starts the motor. The ignition has an unlocked state in which the user can cause the ignition to start the motor by actuating a start mechanism. The ignition also has a locked state in which actuation of the start mechanism by the user does not cause the ignition to start the motor. The vehicle also has a receiver that receives the air-borne signal from the transmitter. The vehicle further has a controller in communication with each of the ignition and the receiver. The controller switches the ignition from the locked state to the unlocked state dependent upon the air-borne signal received by the receiver.

2 Claims, 5 Drawing Sheets

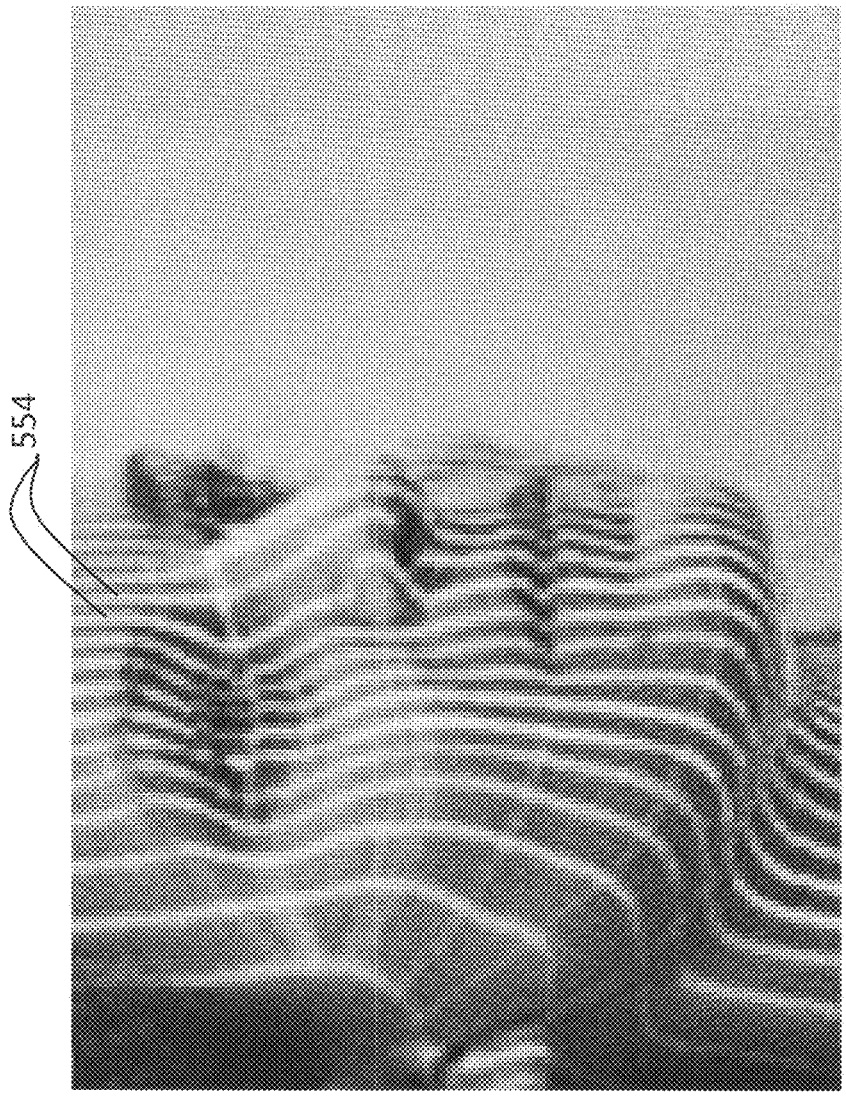

RF BIOMETRIC IGNITION CONTROL SYSTEM

FIELD OF THE INVENTION

The present invention generally relates to an ignition control system. In particular, the present invention relates to an ignition control system that verifies the identity of the user before unlocking the ignition system.

BACKGROUND OF THE INVENTION

Biometric sensors are rapidly developing. However, applications of biometric sensors have not yet made it to the vehicle market due to difficulty in integrating biometric sensors into the vehicle environment and due to the need to meet quality assurance guidelines. Consequently, there is no secure vehicle system with biometric sensor capability at the present time. In vehicles of today, once the door is open, any user can drive the car. Currently, there are no biometric sensors and controls for vehicles.

Biometric sensors of any kind, such as facial scanners, retina scanners, fingerprint sensors, hand scanners and DNA scanners, have not yet been made to meet automotive quality specifications. One problem is that vehicle applications for biometric sensors are not very secure. Once these biometric systems are accepted by the automobile industry, then the systems will also need to be secure in the event of criminal activity in or near the car, such as an attempted car-jacking or abduction. In one embodiment, the present invention uses a facial recognition system as the primary biometric security system. Once this vehicle system recognizes one of many pre-approved drivers, the rest of the biometric systems and controls are unlocked via RF transmitter/receiver pairs, thus allowing full access and customization of vehicle parameters, such as seat adjustments, radio station presets, suspension system, environmental and steering wheel adjustments.

Known ignition devices are on the steering column or ignition switch and do not provide security. There are no known ignition devices that include remote control with built-in biometric security.

SUMMARY OF THE INVENTION

The disclosed embodiments of the present invention relate to a secure biometric system for vehicle applications, sensors and controls. In some embodiments, the biometric system includes a radio frequency transmitter and receiver. Any biometric sensor, such as facial scanners, retina scanners, fingerprint sensors, hand scanners and DNA scanners may serve as the main security gate into the rest of the vehicle system.

The RF Biometric Ignition Control System (RBICS) of the present invention may be a remote control biometric based ignition system. In one embodiment, the inventive system may be used to start any engine that has an RF receiver communicatively coupled to its ignition switch. The biometric sensor may be any type of finger print sensor, skin texture/color finger sensor or iris optic nerve sensor. The RBICS may solve the problem of remote control security of ignition systems.

The biometric sensors utilized in the invention can be any type of finger print sensor, skin texture/color finger sensor, iris optic nerve sensor, facial recognition system, DNA recognition system, hand palm recognition system, handwriting recognition system, or voice recognition system. The RF transmitter may transmit an ON signal to the receiver of the ignition switch at the vehicle to open doors and start the vehicle engine. All ten fingers of each individual driver, up to a selectable number of drivers, can be stored as a finger print template. By storing all ten of a driver's fingerprints, the system may still be operable when certain ones of the driver's fingers are injured and possibly bandaged.

In a particular embodiment, the invention comprises an electronic ignition control system including a keyfob having a biometric sensor which senses an identifying biological characteristic of the user. A transmitter in the keyfob transmits an air-borne signal dependent upon the identifying biological characteristic. A vehicle includes a motor and an ignition which starts the motor. The ignition has an unlocked state in which the user can cause the ignition to start the motor by actuating a start mechanism. The ignition also has a locked state in which actuation of the start mechanism by the user does not cause the ignition to start the motor. A receiver in the vehicle receives the air-borne signal from the transmitter. A controller in the vehicle is in communication with each of the ignition and the receiver. The controller switches the ignition from the locked state to the unlocked state dependent upon the air-borne signal received by the receiver.

In another particular embodiment, the invention comprises a vehicle including a motor and an ignition which starts the motor. The ignition has an unlocked state in which the user can cause the ignition to start the motor by actuating a start mechanism, and a locked state in which actuation of the start mechanism by the user does not cause the ignition to start the motor. A biometric sensor senses an identifying biological characteristic of the user. A controller is in communication with each of the ignition and the biometric sensor. The controller switches the ignition from the locked state to the unlocked state dependent upon the sensed biological characteristic.

In yet another particular embodiment, the invention comprises a vehicle electronic ignition control arrangement including a keyfob having a first biometric sensor which senses a first identifying biological characteristic of the user. The keyfob includes a transmitter which transmits an air-borne signal indicative of the first identifying biological characteristic. A vehicle includes a motor, and an ignition that starts the motor. The ignition has an unlocked state in which the user can cause the ignition to start the motor by actuating a start mechanism, and a locked state in which actuation of the start mechanism by the user does not cause the ignition to start the motor. A receiver receives the air-borne signal from the transmitter. A second biometric sensor senses a second identifying biological characteristic of the user. A controller is in communication with each of the ignition. the receiver, and the second biometric sensor. The controller switches the ignition from the locked state to the unlocked state dependent upon each of the air-borne signal received by the receiver and the sensed second identifying biological characteristic.

BRIEF DESCRIPTION OF THE DRAWINGS

The above-mentioned and other features and advantages of the present invention, and the manner of attaining them, will become apparent and be better understood by reference to the following description of one embodiment of the invention in conjunction with the accompanying drawings, wherein:

FIG. 5 is an exemplary image of a user's face captured by the camera of the arrangement of FIG. 4, with contour lines produced by the digital light projector of FIG. 4.

Corresponding reference characters indicate corresponding parts throughout the several views. The exemplifications set out herein illustrate a preferred embodiment of the invention, in one form, and such exemplifications are not to be construed as limiting in any manner the scope of the invention.

DETAILED DESCRIPTION OF THE PREFERRED EMBODIMENTS

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Figure 1:
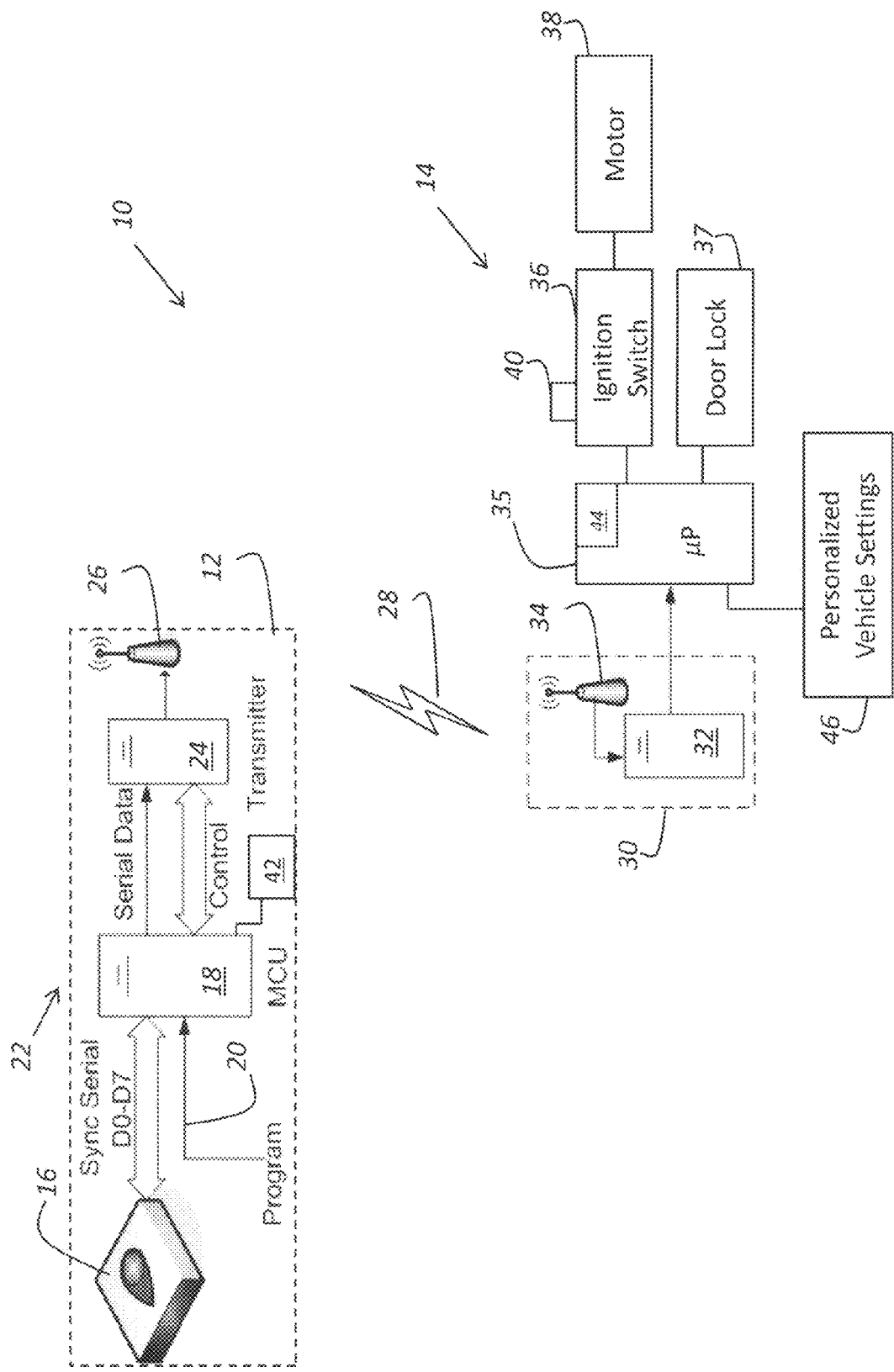
FIG. 1 is a block diagram of a electronic ignition control system in accordance with an exemplary embodiment of the present invention.

In the exemplary embodiment of the present invention in FIG. 1, there is shown an electronic ignition control system 10 including a keyfob 12 and vehicle 14. Keyfob 12 includes a biometric sensor 16 for sensing an identifying biological characteristic of a user or driver of vehicle 14. In the particular embodiment shown in FIG. 1, sensor 16 is in the form of a fingerprint sensor 16. Fingerprint sensor 16 may be a model number AES2510 fingerprint sensor marketed by AuthenTec, Inc. of Melbourne, Fla.

Keyfob 12 also includes a microcontroller (MCU) 18 which is communicatively coupled to sensor 16. MCU 18 may be a model number CC430 MCU/RF IC marketed by Texas Instruments, or a model number BF531 CPU marketed by Analog Devices, for example. MCU 18 may be programmed, as indicated at 20, at the car dealership at which system 10 is sold. Alternatively, MCU 18 may be programmed via push pin programming or by use of a personal computer and a mini USB connector.

Keyfob 12 also includes a transmitter 22 communicatively coupled to MCU 18. Transmitter 22 includes an RF transmitter IC 24 and an antenna 26. Transmitter 22 may transmit an air-borne RF signal indicated at 28 dependent upon an identifying biological characteristic sensed by sensor 16.

Vehicle 14 includes a radio frequency receiver 30 that receives air-borne RF signal 28 from transmitter 22. In one embodiment, receiver 30 may receive signal 28 up to about 100 feet from transmitter 22. However, in other embodiments, receiver 30 may receive signal 28 only up to about five feet from transmitter 22. Receiver 30 may include a RF receiver IC 32 and a receiving antenna 34.

Receiver 30 may be in communication with a controller 35, which may be a microprocessor. Controller 35 may, in turn, be in communication with an ignition switch 36 and a door lock 37.

Ignition switch 36 may be configured to start a motor 38, and may include a start mechanism 40. Start mechanism 40 may require the turning of a key, or may be some other mechanism such as a pushbutton, for example. Ignition switch 36 has an unlocked state in which the user can cause ignition switch 36 to start motor 38 by actuating start mechanism 40, and a locked state in which actuation of start mechanism 40 by the user does not cause ignition switch 36 to start motor 38.

Controller 35 may switch ignition switch 36 from the locked state to the unlocked state dependent upon the air-borne RF signal received by receiver 30. In one embodiment, controller 35 switches ignition switch 36 from the locked state to the unlocked state, and unlocks a door of vehicle 14 (i.e., unlocks door lock 37), if the air-borne RF signal received by the receiver 30 indicates that the user is a person who has been pre-approved to drive vehicle 14.

Keyfob 12 may produce a digital representation of the user's fingerprint. In one embodiment, keyfob 12 includes a memory device 42 storing digital representations of fingerprints of pre-approved drivers of vehicle 14. MCU 18 of keyfob 12 may compare the produced digital representation of the fingerprint to the stored digital representations of the fingerprints of pre-approved drivers of the vehicle.

In another embodiment, vehicle 14 includes a memory device 44 storing digital representations of fingerprints of pre-approved drivers of vehicle 14. The air-borne RF signal transmitted by keyfob 12 includes the produced digital representation of the fingerprint, and controller 35 compares the produced digital representation of the fingerprint to the stored digital representations of the fingerprints of pre-approved drivers of vehicle 14.

Controller 35 may implement a personalized vehicle settings 46 if the air-borne signal 28 received by receiver 30 indicates that the user is a person who has been pre-approved to drive vehicle 14. The personalized vehicle settings 46 may include a seat adjustment (e.g., motorized seat position), radio station presets, a suspension system setting, an environmental (HVAC) setting, and/or a steering wheel adjustment (e.g., vertical position), for example.

Figure 2A:
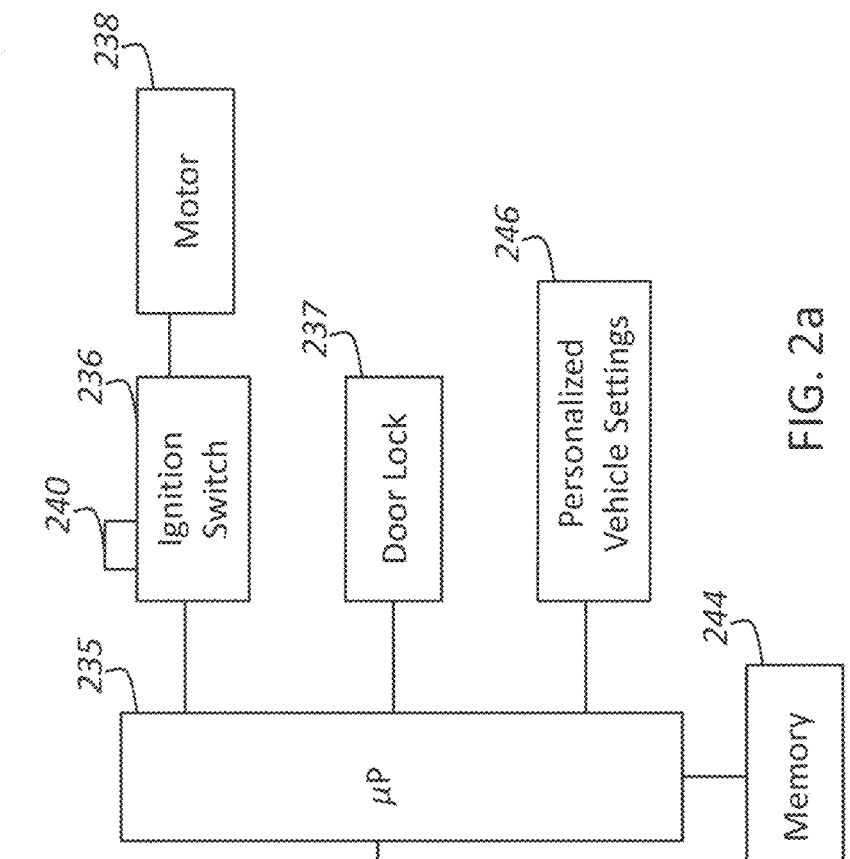
FIG. 2a is a block diagram of a vehicle in accordance with an exemplary embodiment of the present invention.
Figure 2B:
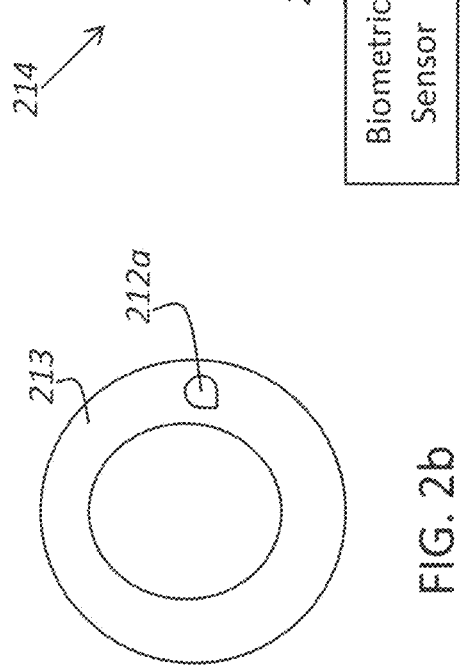
FIG. 2b is a schematic view of a steering wheel of the vehicle of FIG. 2a with a biometric sensor thereon.
Figure 2C:
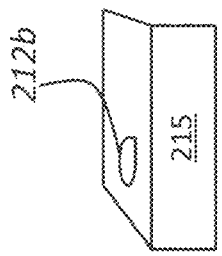
FIG. 2c is a schematic view of a console of the vehicle of FIG. 2a with a biometric sensor thereon.

Another embodiment of a vehicle 214 of the present invention is shown in FIG. 2a. Vehicle 214 includes a biometric sensor 212a that senses an identifying biological characteristic of the user, such as a fingerprint. However, it is alternatively possible for the biometric sensor to sense or recognize a face, a retina, a hand or DNA of the user. As shown in FIG. 2b, sensor 212a may be on a steering wheel 213 of vehicle 214. In another embodiment, shown in FIG. 2c, a sensor 212b may be on a console 215 of vehicle 214.

Vehicle 214 includes a controller 235 in communication with an ignition switch 236 and with biometric sensor 212a. Controller 235 may switch ignition switch 236 from the locked state to the unlocked state dependent upon the biological characteristic sensed by sensor 212a.

Ignition switch 236 may be used to start a vehicle motor 238. Ignition switch 236 has an unlocked state in which a user can cause ignition switch 236 to start motor 238 by actuating a start mechanism 240. Ignition switch 236 also has a locked state in which actuation of start mechanism 240 by the user does not cause ignition switch 236 to start motor 238. Controller 235 may switch ignition switch 236 from the locked state to the unlocked state if a signal from the sensor 212a indicates that the user is a person who has been pre-approved to drive vehicle 214.

Biometric sensor 212a may produce a digital representation of the fingerprint. Vehicle 214 may include a memory device 244 storing digital representations of fingerprints of pre-approved drivers of vehicle 214. Controller 235 may compare the produced digital representation of the fingerprint to the stored digital representations of the fingerprints of pre-approved drivers of the vehicle. Controller 235 may unlock ignition switch 236, as well as unlock a door lock 237, only if the produced digital representation of the fingerprint matches one of the stored digital representations of the fingerprints of pre-approved drivers of the vehicle.

In addition to unlocking ignition switch 236 and door lock 237, controller 235 may implement a personalized vehicle setting 246 if the signal from biometric sensor 212a indicates that the user is a person who has been pre-approved to drive vehicle 214. Personalized vehicle settings 246 may include a seat adjustment, radio station presets, a suspension system setting, an environmental setting, and/or a steering wheel adjustment.

Although a biometric sensor in the form of a fingerprint sensor is shown in FIG. 2a, it is also possible within the scope of the invention for the biometric sensor to sense a face, a retina, a hand or DNA of the user.

Figure 3:
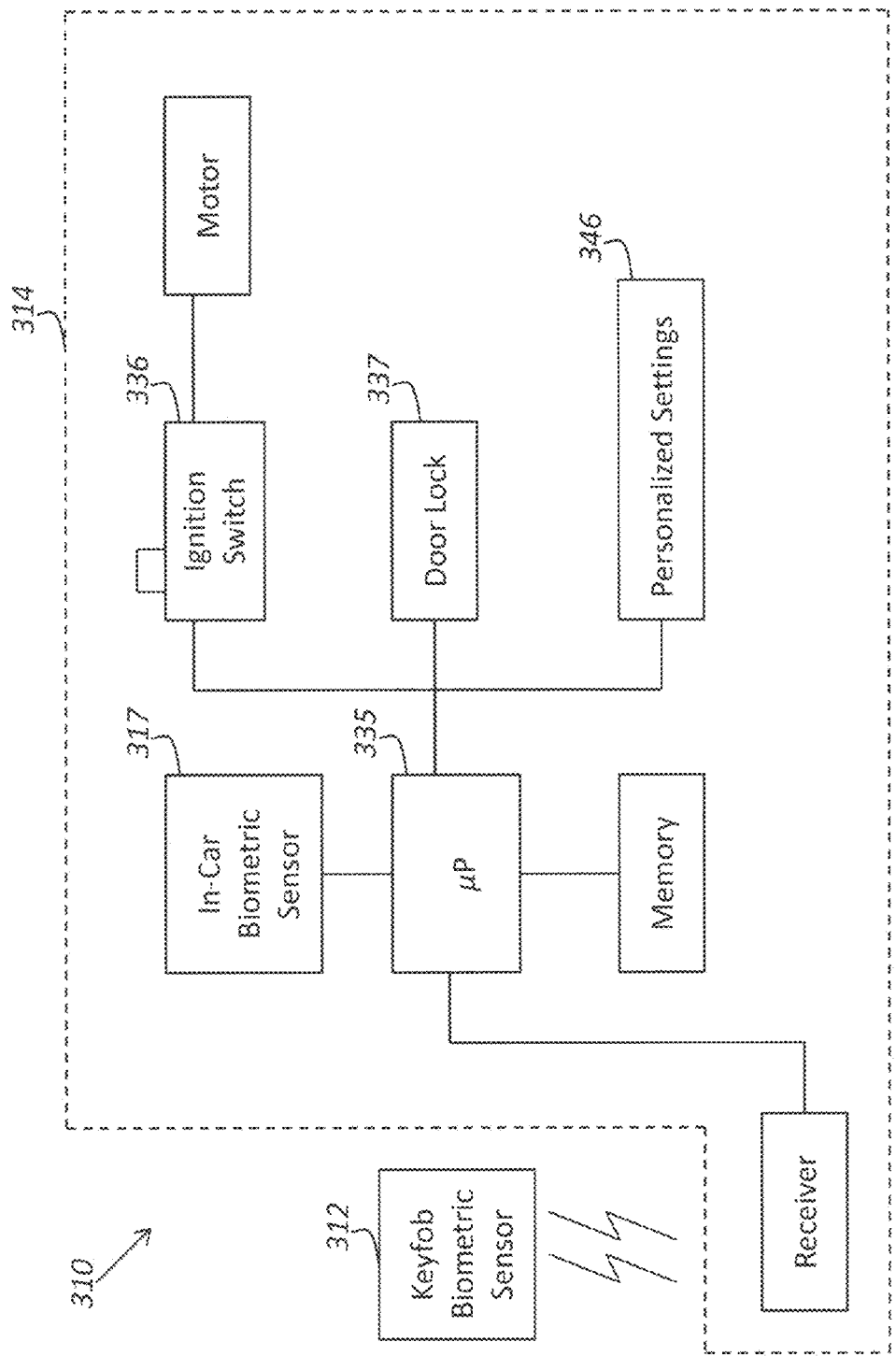
FIG. 3 is a block diagram of a vehicle electronic ignition control arrangement in accordance with an exemplary embodiment of the present invention.

In the exemplary embodiment of the present invention in FIG. 3, there is shown an electronic ignition control arrangement 310 including a keyfob biometric sensor 312 and vehicle 314. Arrangement 310 includes a combination of the embodiments of FIGS. 1 and 2 in that controller 335 switches the ignition from the locked state to the unlocked state dependent upon both the air-borne signal received by the receiver and the identifying biological characteristic sensed by the in-car sensor. That is, controller 335 unlocks ignition switch 336 and door lock 337, and implements personalized settings 346, only if both keyfob biometric sensor 312 and an in-car biometric sensor 317 both indicate that the user is a pre-approved driver of vehicle 314.

In one embodiment, controller 335 may switch the ignition from the locked state to the unlocked state only if the air-borne signal is indicative of the keyfob transmitter being within a predetermined distance of the receiver, such as within five feet, or within twenty-five feet, for example.

In one embodiment, keyfob 312 senses a fingerprint of a first finger of the user, and the in-car biometric sensor senses a fingerprint of a second finger of the user, the second finger being different from the first finger. One or both of keyfob biometric sensor 312 and in-car biometric sensor 317 may be other than a fingerprint sensor, such as a face sensor, a retina sensor, a hand sensor, or a DNA sensor, for example.

Other features of arrangement 310 may be similar to those described above with regard to FIGS. 1 and 2, and thus are not described in detail herein in order to avoid needless repetition.

Figure 4:
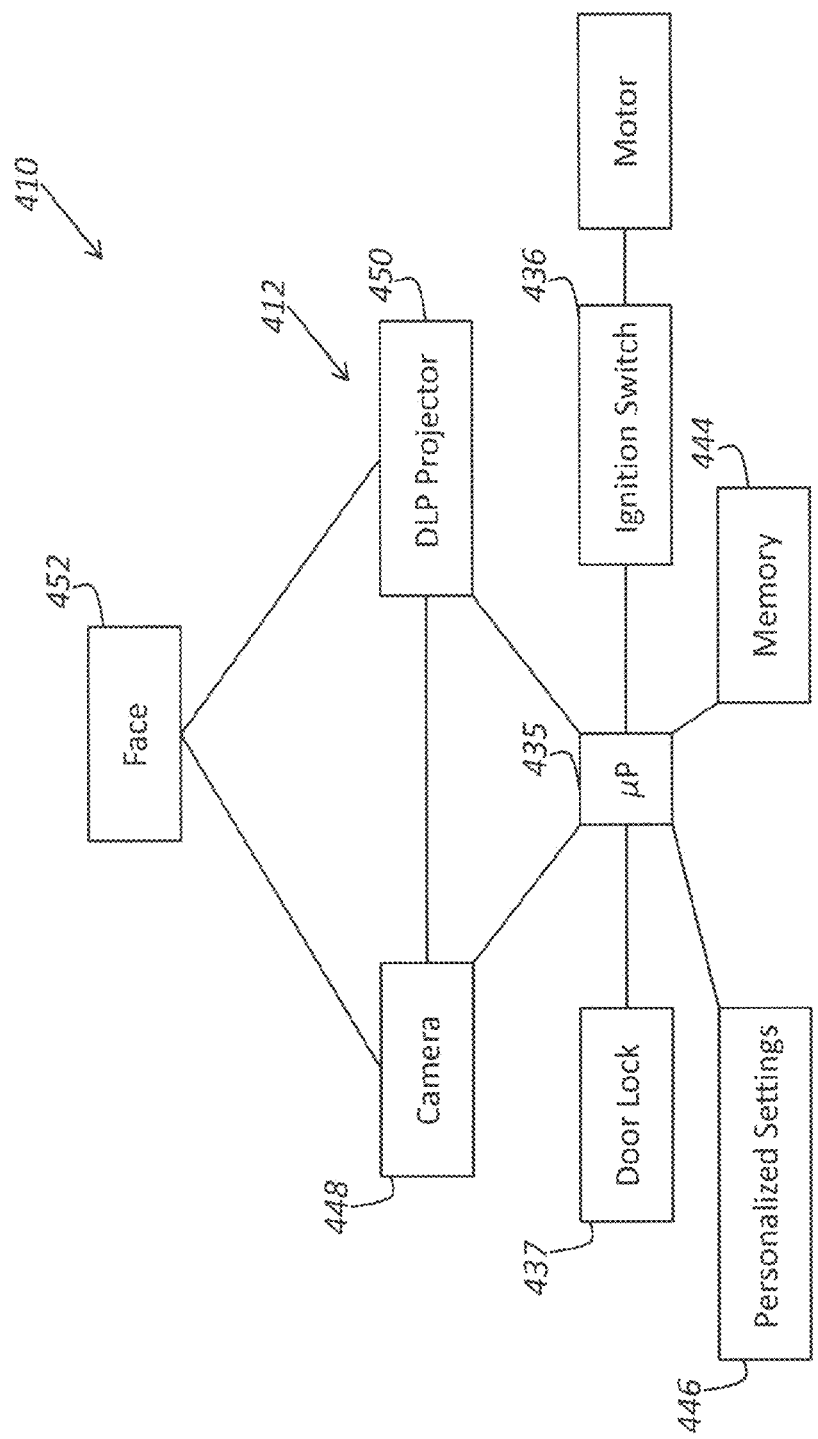
FIG. 4 is a block diagram of a facial recognition-based vehicle electronic ignition control arrangement in accordance with an exemplary embodiment of the present invention.

In the exemplary embodiment of the present invention in FIG. 4, there is shown a facial recognition-based electronic ignition control arrangement 410 for a vehicle including a biometric face recognition sensor system 412 having a camera 448 and a digital light projector (DLP) 450. A controller 435 unlocks ignition switch 436 and door lock 437, and implements personalized settings 446, only if face recognition sensor system 412 recognizes a face 452 of a user as being that of a pre-approved driver of the vehicle in which system 412 is installed.

In one embodiment, digital light projector 450 is configured to receive image data captured by camera 448. Using the shapes in the two-dimensional camera image, the DLP may determine the 3D contour lines of the person's face 452. Such contour lines may be the same regardless of the viewpoint of camera 448. That is, regardless of the angle at which camera 448 captures images of face 452, the 3D contour lines of the face can be accurately determined.

An example image of a user's face 452 captured by camera 448 is shown in FIG. 5. From the shapes in this two-dimensional image, DLP 450 may derive contour lines 554. DLP 450 may store a digitized representation of contour lines 554 of pre-approved users in memory device 444 (FIG. 4). When a person enters the vehicle (e.g., sits in the driver's seat), then biometric face recognition sensor system 412 captures one or more images of the person's face, and digital light projector 450 calculates a new set of contour lines 554. Processor 435 may then compare the a new set of contour lines 554 to the sets of contour lines of pre-approved drivers stored in memory device 444. If processor 435 determines that there is a sufficient level of similarity between the new set of contour lines 554 and one of the sets of contour lines stored in memory, then processor 435 determines that the person is one of the pre-approved users. Processor 435 implements personalized settings 446 and/or unlocks ignition switch 436.

Other features of arrangement 410 may be similar to those described above with regard to FIGS. 1 and 2, and thus are not described in detail herein in order to avoid needless repetition.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A vehicle electronic ignition control arrangement, comprising:
  a keyfob including:
    a first biometric sensor configured to sense a first identifying biological characteristic of a user; and
    a transmitter configured to transmit an air-borne signal indicative of the first identifying biological characteristic; and
  a vehicle including:
    a motor;
    an ignition configured to start the motor, the ignition having an unlocked state in which the user can cause the ignition to start the motor by actuating a start mechanism, and a locked state in which actuation of the start mechanism by the user does not cause the ignition to start the motor;
    a receiver configured to receive the air-borne signal from the transmitter;
    a second biometric sensor configured to sense a second identifying biological characteristic of the user; and
    a controller in communication with each of the ignition, the receiver, and the second biometric sensor, the controller being configured to switch the ignition from the locked state to the unlocked state dependent upon both the air-borne signal received by the receiver and the sensed second identifying biological characteristic if both the air-borne signal received by the receiver and the sensed second identifying biological characteristic are indicative of a same approved user, the first identifying biological characteristic being one fingerprint of the user, the second identifying biological characteristic being an other fingerprint of the user.

2. The arrangement of claim 1, wherein the controller is configured to switch the ignition from the locked state to the unlocked state only if the air-borne signal is indicative of the transmitter being within a predetermined distance of the receiver.

* * * * *